(12) United States Patent
Oh

(10) Patent No.: US 8,662,729 B2
(45) Date of Patent: Mar. 4, 2014

(54) LIGHT UNIT AND DISPLAY APPARATUS HAVING THE SAME

(75) Inventor: Nam Seok Oh, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 536 days.

(21) Appl. No.: 12/818,671

(22) Filed: Jun. 18, 2010

(65) Prior Publication Data

US 2011/0026269 A1 Feb. 3, 2011

(30) Foreign Application Priority Data

Jul. 28, 2009 (KR) ........................ 10-2009-0069135

(51) Int. Cl.
*G02F 1/13357* (2006.01)
*F21V 8/00* (2006.01)

(52) U.S. Cl.
USPC .......... 362/613; 362/615; 362/616; 362/97.1; 362/610; 362/235

(58) Field of Classification Search
USPC ........ 362/610, 613, 615, 97.1, 235, 237, 240, 362/616
See application file for complete search history.

(56) References Cited

U.S. PATENT DOCUMENTS

| | | | | |
|---|---|---|---|---|
| 7,413,330 B2* | 8/2008 | Furukawa | ..................... | 362/600 |
| 7,686,494 B2* | 3/2010 | Song | ............................. | 362/612 |
| 8,092,064 B2* | 1/2012 | Erchak et al. | ................. | 362/613 |
| 8,243,231 B2* | 8/2012 | Hur et al. | ........................ | 349/65 |
| 8,282,260 B2* | 10/2012 | Kim et al. | ...................... | 362/616 |
| 2001/0017774 A1 | 8/2001 | Ito et al. | | |
| 2005/0201120 A1 | 9/2005 | Nesterenko et al. | | |
| 2008/0205078 A1 | 8/2008 | Karlicek et al. | | |
| 2010/0305040 A1* | 12/2010 | Lee et al. | ..................... | 514/17.7 |
| 2011/0025730 A1* | 2/2011 | Ajichi | .......................... | 345/690 |
| 2011/0051045 A1* | 3/2011 | Hur et al. | ........................ | 349/65 |
| 2011/0109835 A1* | 5/2011 | Masuda et al. | .................. | 349/61 |
| 2011/0109836 A1* | 5/2011 | Tanaka et al. | ................... | 349/61 |
| 2012/0206670 A1* | 8/2012 | Kim et al. | ....................... | 349/65 |

FOREIGN PATENT DOCUMENTS

| | | |
|---|---|---|
| EP | 1847858 | 10/2007 |
| EP | 1876426 | 1/2008 |
| EP | 2 124 078 A1 | 11/2009 |
| JP | 2002-042537 | 7/2000 |
| JP | 2008-191429 | 2/2007 |
| JP | 2007-214142 | 8/2007 |
| JP | 2008-293826 | 12/2008 |
| KR | 10-2007-0000915 | 1/2007 |
| KR | 10-2009-0000347 | 1/2009 |
| KR | 10-2009-0019208 | 2/2009 |
| KR | 10-2009-0031884 | 3/2009 |
| WO | WO 2008/032275 | 3/2008 |
| WO | WO 2008/032277 | 3/2008 |
| WO | WO 2008-102297 | 8/2008 |

* cited by examiner

*Primary Examiner* — Anabel Ton
(74) *Attorney, Agent, or Firm* — McKenna Long & Aldridge LLP

(57) ABSTRACT

Disclosed is a light unit. The light unit includes: a light guide plate having a plurality of grooves formed on one side thereof; a light guide extension formed at one side of the groove; and at least one light emitting diode allowing light to be incident on the light guide plate through the light guide extension.

24 Claims, 4 Drawing Sheets

LIGHT UNIT AND DISPLAY APPARATUS HAVING THE SAME

The present application claims priority under 35 U.S.C. §119 to Korean Patent Application No. 10-2009-0069135, filed on Jul. 28, 2009, the entirety of which is hereby incorporated by reference.

BACKGROUND

1. Field

This embodiment relates to a light unit and a display apparatus having the same.

2. Description of the Related Art

A light emitting diode (LED) constitutes a light emitting source by using a compound semiconductor material such as a GaAs based material, AlGaAs based material, GaN based material, InGaN based material, InGaAlP based material and the like.

Such an LED is packaged and used as a light emitting device emitting various colors. The light emitting device is now being used as various light sources such as a lighting indicator indicating colors, a character indicator and an image display and the like.

SUMMARY

One aspect of this invention is a light unit. The light unit includes: a light guide plate having a plurality of grooves formed on one side thereof; a light guide extension formed at one side of the groove; and at least one light emitting diode allowing light to be incident on the light guide plate through the light guide extension.

Another aspect of this invention is a display apparatus. The display apparatus includes: a light guide plate having a plurality of grooves formed on the bottom surface thereof; a light guide extension formed at one side of the groove; at least one light emitting diode allowing light to be incident on the light guide plate through the light guide extension; and a display panel on the light guide plate.

BRIEF DESCRIPTION OF THE DRAWINGS

The embodiment will be described in detail with reference to the following drawings.

DETAILED DESCRIPTION OF EMBODIMENTS

Hereinafter, descriptions will be provided with reference to the accompanying drawings. The embodiments can be variously modified. The scope of the embodiment is not limited to that of the following description. The embodiment is provided for giving those skilled in the art more complete description. Therefore, the shapes and sizes and the like of components of the drawings may be exaggerated for clarity of the description.

Figure 1:
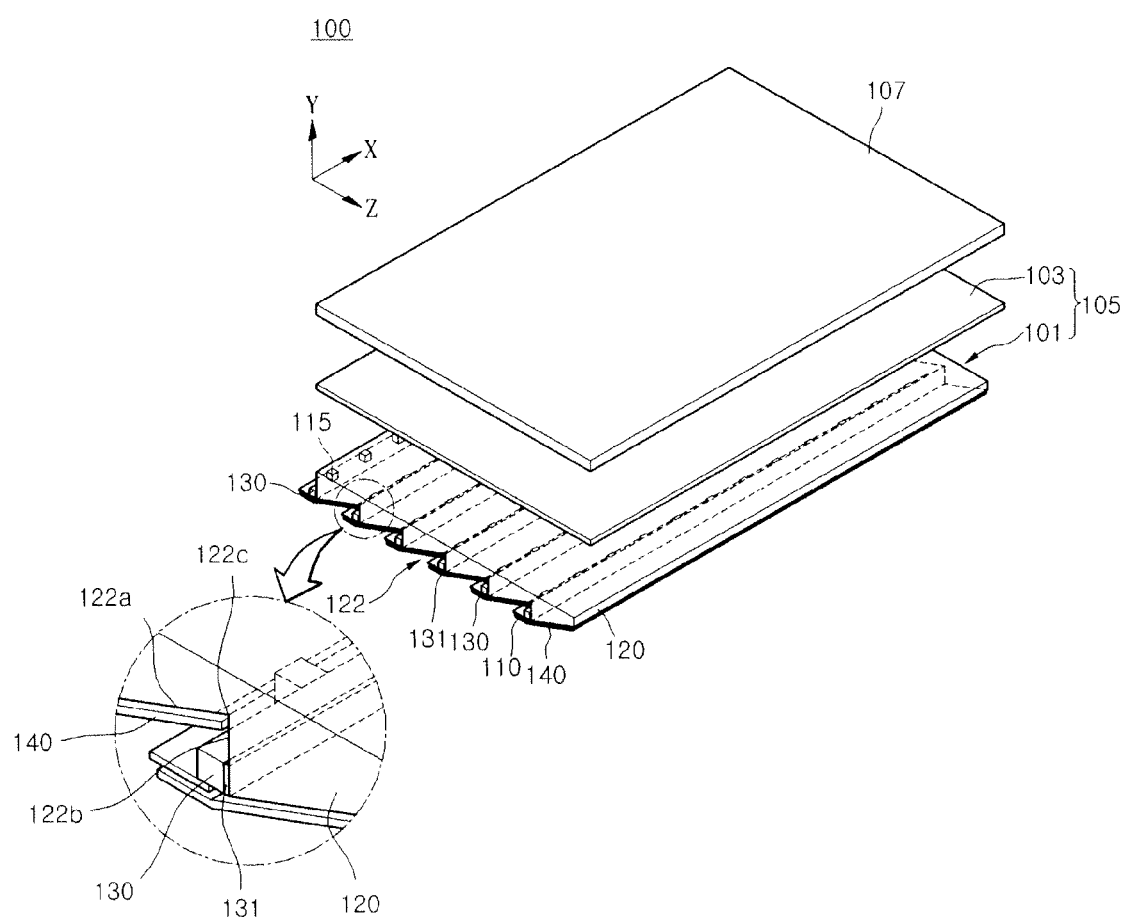
FIG. 1 is a perspective view of a display apparatus according to an embodiment.
Figure 2:
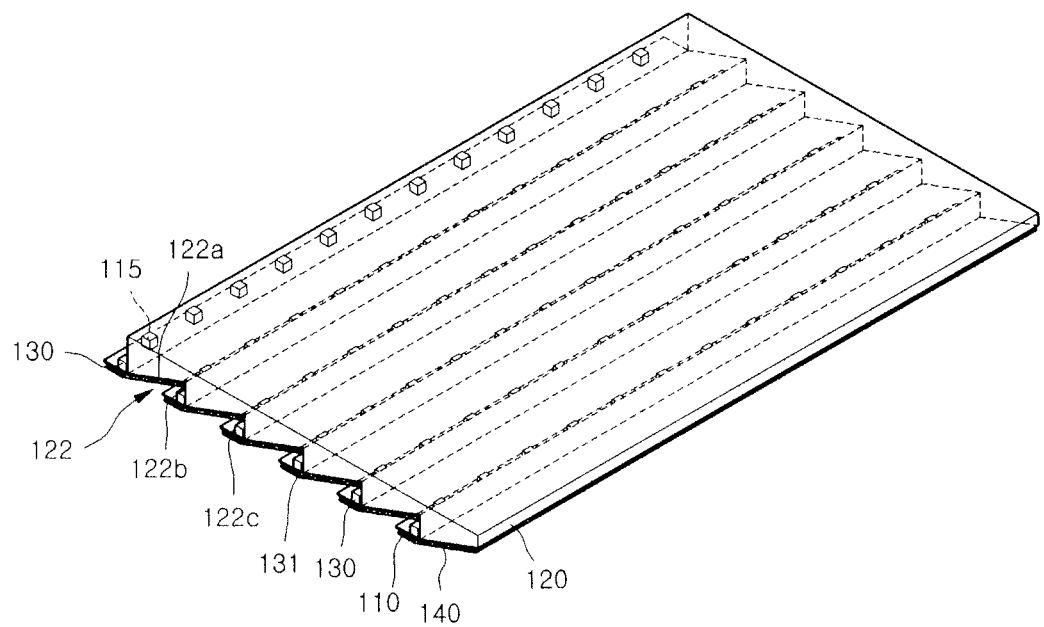
FIG. 2 is a perspective view of a light source unit of the display apparatus of FIG. 1.
Figure 3:
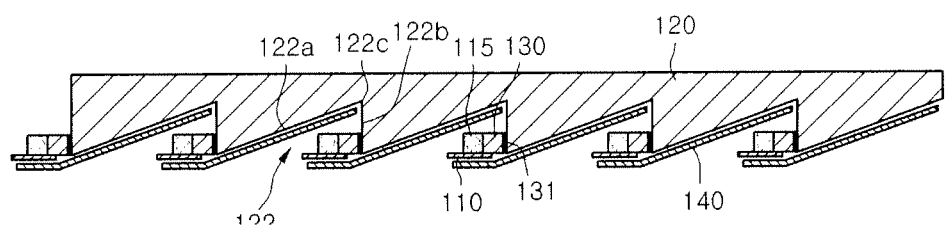
FIG. 3 is a side view of FIG. 2.

FIG. 1 is a perspective view of a display apparatus according to an embodiment. FIG. 2 is a perspective view of a light source unit of the display apparatus of FIG. 1. FIG. 3 is a side view of FIG. 2.

As shown in FIG. 1, a display apparatus 100 includes a light unit 105 and a display panel 107.

The light unit 105 includes a light source unit 101 and an optical sheet 103.

The light unit 105 can be housed in a groove of a bottom cover (not shown).

The display panel 107 displays image information by using light irradiated from the light unit 105. For example, the display panel 107 can be made by using a liquid crystal display panel. The display panel 107 includes an upper substrate, a lower substrate, a liquid crystal layer interposed between the two substrates. The display panel 107 may further include polarized sheets which are in close contact with the top surface of the upper substrate and the bottom surface of the lower substrate respectively.

The display panel 107 can be divided into a plurality of areas and driven in correspondence to a local dimming driving method or an impulsive driving method. The driving method of the display panel 107 is not limited to the aforementioned ones.

The optical sheet 103 of the light unit 105 may be placed under the display panel 107. The optical sheet 103 can be detached. The placement of the optical sheet 103 is not limited to this.

The optical sheet 103 may include a diffusion sheet (not shown) and/or a prism sheet (not shown). The diffusion sheet diffuses light emitted from a light guide plate 120 to be mentioned later. The diffused light is collected into a light emitting area by the prism sheet. Here, the prism sheet may comprises a horizontal or/and vertical prism sheet and at least one brightness enhancement film. The type and number of the optical sheet 103 may be changed within the scope of the embodiment and are not limited to this.

A light source unit 101 generating surface light is disposed under the optical sheet 103.

The light source unit 101 includes a module substrate 110, a light guide plate 120, a light guide extension 130 and at least one light emitting diode 115.

The light guide plate 120 comprises a transparent material. For example, the transparent material includes at least one of an acryl resin based material like a polymethyl metaacrylate (PMMA), a polyethylene terephthlate (PET) resin, a polycarbonate (PC) resin and a polyethylene naphthalate (PEN) resin.

In the light guide plate 120, the top surface thereof functioning as a surface light source is flat. At least one groove 122 is formed on the bottom surface of the light guide plate 120 in one direction of the bottom surface.

A diffusion pattern may be further formed on the top surface of the light guide plate 120.

The groove 122 may be formed to cross from one end to the other end of the light guide plate 120.

The groove 122 includes a first surface 122a, a second surface 122b and an intersection 122c through which the first surface 122a and the second surface 122b meet each other.

The first surface 122a may slope toward the flat of the light guide plate 120. The second surface 122b may be perpendicular to the flat of the light guide plate 120. However, without being limited to this, the second surface 122b may may slope toward the flat of the light guide plate 120.

The length of the intersection 122c is equal to the longitudinal length of the groove 122. That is, the intersection 122c has a length from one end to the other end of the light guide plate 120.

The light guide plate 120 having at least one groove 122 on one side thereof can be integrally formed with respect to one display panel 107 by employing an injection molding method or an extruding method.

The groove 122 can be continuously formed on the bottom surface of the light guide plate 120. The first surface 122a and the second surface 122b may be alternately formed on the bottom surface of the light guide plate 120.

The light guide extension 130 is formed on the second surface 122b of the groove 122 and on one lateral surface of the light guide plate 120 parallel with a longitudinal direction of the groove 122. The light guide extension 130 may have a rectangular parallelepiped shape.

An adhesive member 131 is interposed between the light guide extension 130 and the light guide plate 120.

The adhesive member 131 is, for example, made of a plastic based transparent UV bonding material.

The light guide extension 130 may include the same material as that of the light guide plate 120.

The light guide plate 120 may have the same refractive index as that of the adhesive member 131. Therefore, when light incident on the light guide extension 130 passes through the adhesive member 131 and is incident on the light guide plate 120, there occurs little reflection loss due to no refractive index difference, so optical characteristic is not affected.

For example, if the light guide plate 120 and the light guide extension 130 are made of PMMA material, they and a plastic based adhesive member 131 have the same refractive index of about 1.5. The at least one light emitting diode 115 are arranged adjacently to one side of the light guide extension 130. A module substrate 110 on which the light emitting diodes 115 are mounted is arranged under each of the grooves 122.

The module substrate 110 may comprise a metal core PCB, a FR-4 PCB, a common PCB, a flexible substrate and the like and the material of the module substrate 110 is also variously changed within the scope of the embodiment. A plurality of the bar-typed module substrate 110 may be arranged or a single module substrate 110 having a size corresponding to the total area of a plurality of the light guide plate 120 is arranged. The arrangement of the module substrate 110 is not limited to this.

The at least one light emitting diode 115 may be a white LED or a colored LED emitting at least one color among colors such as red, blue, green and the like. The colored LED may include a red LED, a blue LED and a green LED. Here, the arrangement of the light emitting diodes and the light emitted from the light emitting diodes are changeable within the scope of the embodiment.

In order to provide light to each area of the light guide plate 120, the module substrate 110 supplies electric power to the light emitting diode 115 of each area of the light guide plate 120, thereby individually driving the light emitting diode of each area. Accordingly, the areas of the light guide plate 120 are able to emit lights having different luminances from those of others.

The at least one light emitting diode 115 has a side light emitting type and is arranged at one side of the light guide extension 130. The light emitting diode 115 allows light to be incident on a lateral surface of the light guide extension 130. The light guide plate 120 guides light incident from the second surface 122b of the groove 122 and emits the light through the top surface in the form of a surface light.

A reflective member 140 such as a reflective sheet, a reflective agent and a reflective plate is arranged under or on the bottom surface of the light guide plate 120 and re-reflects the light leaked from the light guide plate 120. The reflective member 140 may be formed under or on the bottom surface of the light guide extension 130.

The reflective member 140 may be formed on the first surface 122a of the groove 122 of the light guide plate 120. The reflective member 140 is not formed on the second surface 122, that is, a light incident surface of the groove 122 of the light guide plate 120.

The light emitted from the at least one light emitting diode 115 may be covered with the reflective member 140 formed on the first surface 122a of the groove 122 in the light emission direction.

In accordance with the size, characteristics of the display apparatus, the specification of the light emitting diode 115 and characteristics of the light guide plate 120, the length and width of the light guide extension 130 are changed. The light guide extension 130 is designed to have an appropriate length for hot spot not to be created.

In the embodiment, a plurality of the grooves 122 are formed on the bottom surface of the light guide plate 120 and at least one light emitting diode 115 is arranged at one side of each of the grooves 122. As a result, it is possible to provide an improved optical uniformity.

In the embodiment, the light guide plate 120 having the grooves 122 on the bottom surface thereof is integrally formed and the light guide extension 130 is adhered to each of the grooves 122 by using the adhesive member 131. Accordingly, it is possible to improve the hot spot and to obtain the optical uniformity.

The embodiment of the present invention provides a partial driving method such as a local dimming driving method and an impulsive driving method and the like, thereby reducing power consumption, improving screen contrast and improving the image quality of the display apparatus.

Also, in the embodiment, the integrally formed light guide plate 120, i.e., a backlight unit which is partially driven makes it possible to individually drive its lighting areas. It is also possible to precisely control a light quantity distribution through the individual lighting area. Moreover, the light emitting diodes are driven individually according to the sub-areas of the entire lighting area, so that the sub-areas can emit lights having different luminances from those of others. Therefore, the display apparatus can show image of enhanced quality.

Figure 4:
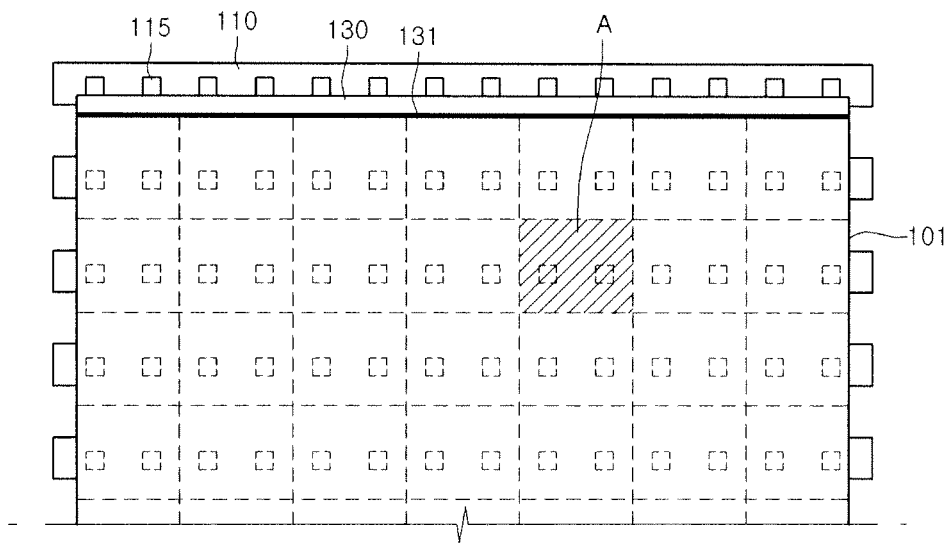
FIG. 4 is a plan view showing an individual driving method of a light unit of the display apparatus according to the embodiment.

FIG. 4 is a plan view showing an individual driving method of a light unit of the display apparatus according to the embodiment.

Referring to FIGS. 1 and 4, the light unit 105 is driven by an entire driving method or a partial driving method. The partial driving method includes a local dimming driving method or an impulsive driving method and the like.

When the at least one light emitting diode 115 is driven by the local dimming driving method, the display panel 107 includes a plurality of unit lighting areas. The luminance of the at least the one light emitting diode 115 can be individually controlled according to the gray peak value of each of the unit lighting areas "A".

When the at least one light emitting diode 115 is driven by the impulsive driving method, each of the lighting areas is synchronized in terms of time with the display panel 107 and is sequentially lighted.

Though the light guide plate 120 is integrally formed, the individual lighting area is created by the groove 122 formed on the bottom surface of the light guide plate 120. Therefore, the light unit 105 can be partially driven and an optical uniformity can be obtained. In other words, while the embodiment shows that the individual unit lighting area "A" is created on the display panel 107, this does not mean that the unit lighting area "A" is physically divided. The integrally formed light guide plate 120 is able to produce a high lighting quality of the boundary of each unit lighting area "A".

The driving method of the at least one light emitting diode 115 is variously changed according to the circuit design thereof. There is no limit to the driving method of the light emitting diode 115.

Figure 5:
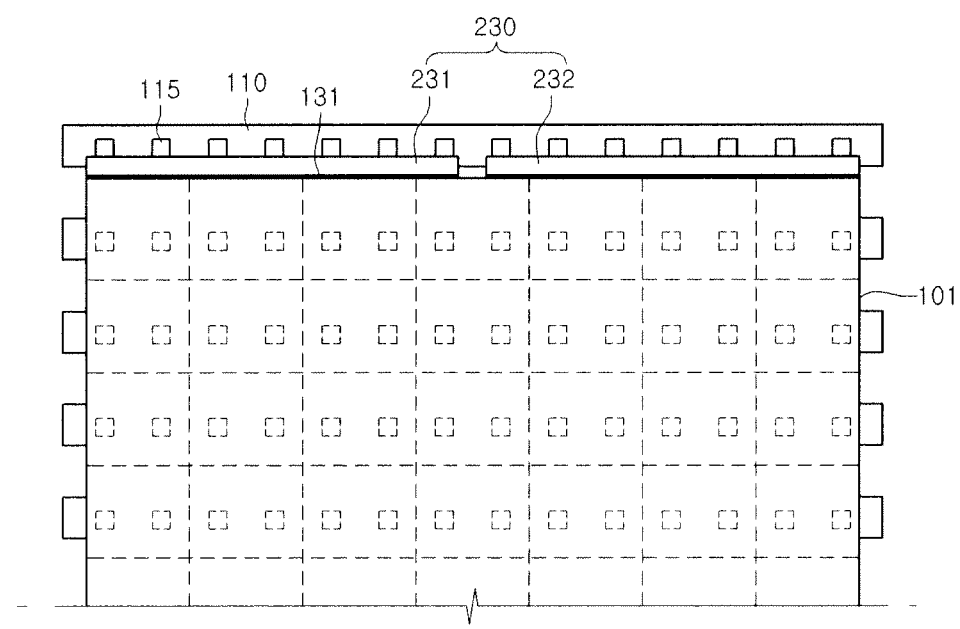
FIG. 5 is a plan view showing another example of the light unit according to the embodiment.

FIG. 5 is a plan view showing another example of the light unit according to the embodiment. Here, the light guide extension and the light emitting diode arranged on the outer surface of the light guide plate are shown and described. While the light guide extension and the light emitting diode arranged inside the groove are not shown, it can be expected that the light guide extension and the light emitting diode are formed in the same shapes as those of FIG. 5.

In description of a light unit shown in FIG. 5, the repetitive descriptions of the same parts as those of the aforementioned embodiment will be omitted.

According to the embodiment described above, a light guide extension 130 of the light unit 105 is formed to have the same length as that of each of the grooves 122.

Referring to FIG. 5, the light guide extension 230 is divided into two or more light guide extensions 231 and 232 with respect to the length of the edge of the light unit 105 in consideration of the specification and the light generation range of the light emitting diode 115 and.

Figure 6:
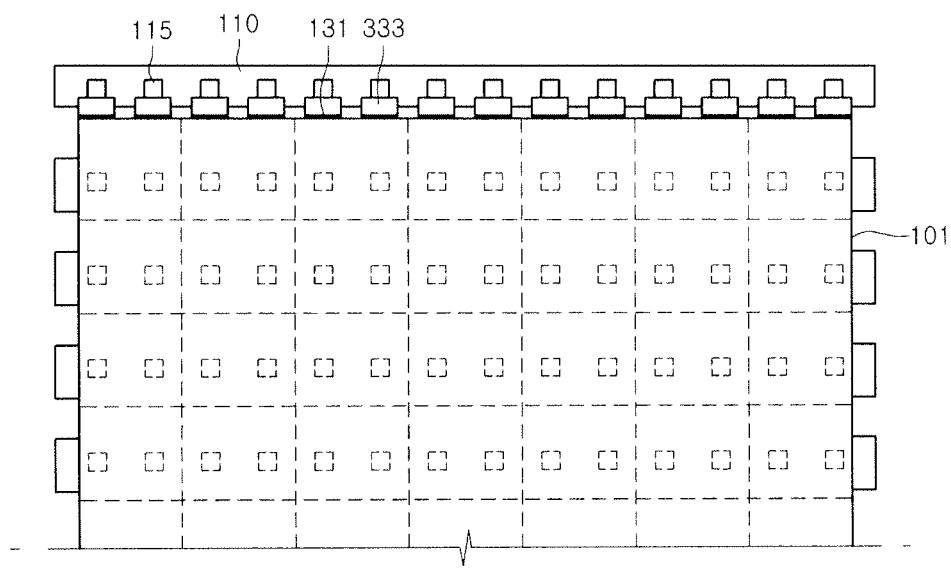
FIG. 6 is a plan view showing further another example of the light unit according to the embodiment.

FIG. 6 is a plan view showing further another example of the light unit according to the embodiment.

In description of a light unit shown in FIG. 6, the repetitive description of the same parts as those of the aforementioned embodiment will be omitted.

Referring to FIG. 6, the light guide extension 333 of the light unit is formed corresponding one-to-one to the light emitting diodes 115 in consideration of the specification and the light generation range of the light emitting diode 115.

That is, a plurality of the light guide extensions 333 are adhered to one side of the light guide plate 120 and to one side of the groove by means of the adhesive member 131. In addition, the light emitting diodes 115 are arranged one-to-one correspondingly to the one side of the light guide extensions 333.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A light unit comprising:
a light guide plate having a plurality of grooves extending longitudinally on one side of the light guide plate;
a light guide extension formed in each of the plurality of grooves, wherein each light guide extension is attached to a surface of the light guide plate which, at least in part, forms the corresponding groove, and wherein each light guide extension extends longitudinally within the corresponding groove; and
at least one light emitting diode formed in each of the plurality of grooves, wherein the at least one light emitting diode is disposed at one side of the light guide extension, each of the at least one light emitting diodes configured to emit light through a corresponding light guide extension and into the light guide plate.

2. The light unit of claim 1 further comprising:
an adhesive member between each light guide extension and a corresponding light guide plate surface to which the light guide extension is attached.

3. The light unit of claim 1, wherein the light guide plate comprises:
a flat front surface through which light is reflected;
a plurality of first surfaces; and
a plurality of second surfaces,
wherein each of the plurality of first surfaces is perpendicular to the flat front surface,
wherein each of the plurality of second surfaces intersects a corresponding one of the first surfaces proximate to the flat front surface, and
wherein each of the plurality of second surfaces slopes rearward from the intersection with the corresponding first surface such that each second surface and the corresponding first surface form one of the plurality of grooves.

4. The light unit of claim 3, wherein each of the light guide extensions is attached to the first surface of the corresponding groove.

5. The light unit of claim 4, further comprising:
a reflective member formed on each of the second surfaces such that the light emitted through the corresponding light guide extension passes into the light guide plate through the first surface to which the corresponding light guide extension is attached and is reflected by the reflective member through the flat front surface.

6. The light unit of claim 5, wherein the reflective member formed on each of the second surfaces extends behind the corresponding light guide extension.

7. A light unit comprising:
a light guide plate having a plurality of grooves, the plurality of grooves formed on one side of the light guide plate;
a light guide extension formed in each of the plurality of grooves, wherein each light guide extension is attached to a surface of the light guide plate which, at least in part, forms a corresponding groove, and wherein each light guide extension extends longitudinally within the corresponding groove; and
at least one light emitting diode associated with each of the plurality of grooves emitting light into the light guide plate through a corresponding light guide extension wherein the at least one light emitting diode is disposed at one side of the light guide extension.

8. The light unit of claim 7, wherein the light guide plate comprises the same material as the light guide extension.

9. The light unit of claim 7, wherein each of the plurality of grooves extends a length of the light guide plate.

10. The light unit of claim 7 further comprising:
an adhesive member interposed between each light guide extension and the corresponding light guide plate surface in each of the plurality of grooves to which each light guide extension is attached.

11. The light unit of claim 10, wherein each adhesive member, the light guide extensions, and the light guide plate have the same optical refractive index.

12. The light unit of claim 7, wherein the light guide plate comprises:
a flat front surface;
a plurality of first surfaces; and a plurality of second surfaces,
wherein each of the plurality of first surfaces is perpendicular to the flat front surface, and
wherein each of the plurality of second surfaces intersects a corresponding one of the first surfaces to form the plurality of grooves on a rear surface of the light guide plate.

13. The light unit of claim 12, wherein each light guide extension is formed on the second surface of the corresponding groove.

14. The light unit of claim 7 further comprising:
at least one substrate behind the light guide plate,
wherein the at least one light emitting diode associated with each of the plurality of grooves is mounted on the at least one substrate.

15. The light unit of claim 7, further comprising:
a reflective member formed along at least a portion of each groove and behind the corresponding light guide extension.

16. A display apparatus comprising:
a light guide plate having a plurality of grooves, the plurality of grooves formed on the rear surface of the light guide plate;
a light guide extension formed in each of the plurality of grooves, wherein each light guide extension is attached to a surface of the light guide plate which, at least in part, forms a corresponding groove, and wherein each light guide extension extends longitudinally within the corresponding groove; and
at least one light emitting diode associated with each of the plurality of grooves, wherein the at least one light emitting diode is disposed at one side of the light guide extension, the at least one light emitting diode configured to emit light into the light guide plate through a corresponding light guide extension; and
a display panel positioned to the front of the light guide plate.

17. The display apparatus of claim 16, further comprising an optical sheet arranged between the display panel and the light guide plate.

18. The display apparatus of claim 16 further comprising:
at least one module substrate associated with each of the plurality of grooves, wherein the at least one light emitting diode associated with each groove is mounted on the at least one module substrate associated with the corresponding groove.

19. The display apparatus of claim 18 further comprising:
a plurality of light guide extensions associated with each of the plurality of grooves, wherein one module substrate corresponds to the plurality of light guide extensions associated with the corresponding groove.

20. The display apparatus of claim 16, wherein the light guide plate is integrally formed.

21. The display apparatus of claim 16 further comprising:
at least one reflective member arranged behind the light guide plate.

22. The display apparatus of claim 21 further comprising:
a plurality of reflective members, wherein each of the reflective members is formed behind at least a portion of a corresponding groove and a corresponding light guide extension.

23. The display apparatus of claim 16 further comprising:
an adhesive member interposed between each light guide extension and a corresponding light guide plate surface in each of the plurality of grooves to which each light guide extension is attached.

24. The display apparatus of claim 16, wherein the light guide plate comprises:
a flat front surface;
a plurality of first surfaces; and
a plurality of second surfaces,
wherein each of the plurality of first surfaces is perpendicular to the flat front surface, and
wherein each of the plurality of second surfaces intersects a corresponding one of the first surfaces to form the plurality of grooves on a rear surface of the light guide plate.

* * * * *